(12) United States Patent
Stergiou et al.

(10) Patent No.: US 8,060,503 B2
(45) Date of Patent: Nov. 15, 2011

(54) RANKING NODES FOR SESSION-BASED QUERIES

(75) Inventors: Stergios Stergiou, Sunnyvale, CA (US); Jawahar Jain, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 11/964,249

(22) Filed: Dec. 26, 2007

(65) Prior Publication Data

US 2009/0171928 A1 Jul. 2, 2009

Related U.S. Application Data

(60) Provisional application No. 60/876,546, filed on Dec. 22, 2006.

(51) Int. Cl.
*G06F 7/76* (2006.01)
(52) U.S. Cl. .................................. 707/726; 707/748
(58) Field of Classification Search .................. 707/104, 707/100, 706, 726, 748
See application file for complete search history.

(56) References Cited

U.S. PATENT DOCUMENTS

| | | | | |
|---|---|---|---|---|
| 5,502,714 A * | 3/1996 | Sallberg | | 370/351 |
| 5,864,846 A * | 1/1999 | Voorhees et al. | | 707/5 |
| 6,026,388 A * | 2/2000 | Liddy et al. | | 1/1 |
| 6,285,999 B1 | 9/2001 | Page | | |
| 6,606,619 B2 * | 8/2003 | Ortega et al. | | 707/2 |
| 6,651,096 B1 | 11/2003 | Gai et al. | | |
| 6,697,088 B1 * | 2/2004 | Hollander | | 715/744 |
| 6,799,176 B1 | 9/2004 | Page | | |
| 6,850,252 B1 * | 2/2005 | Hoffberg | | 715/716 |
| 7,058,628 B1 | 6/2006 | Page | | |
| 7,117,206 B1 * | 10/2006 | Bharat et al. | | 707/5 |
| 7,216,312 B2 | 5/2007 | Jain et al. | | |
| 2004/0093571 A1 | 5/2004 | Jain et al. | | |
| 2007/0022102 A1 * | 1/2007 | Saxena | | 707/3 |
| 2008/0154879 A1 * | 6/2008 | Lin | | 707/5 |
| 2009/0112865 A1 * | 4/2009 | Vee et al. | | 707/7 |
| 2009/0319517 A1 * | 12/2009 | Guha et al. | | 707/5 |
| 2009/0319565 A1 * | 12/2009 | Greenwald et al. | | 707/103 Y |
| 2010/0106702 A1 * | 4/2010 | Strumpf et al. | | 707/706 |

OTHER PUBLICATIONS

Brace, et al. "Efficient Implementation of a BDD Package," 1990 IEEE, Paper 3.1, 27th ACM/IEEE Design Automation Conference, pp. 40-45, 1990.

* cited by examiner

*Primary Examiner* — James Trujillo
*Assistant Examiner* — Soheila Davanlou
(74) *Attorney, Agent, or Firm* — Baker Botts L.L.P.

(57) ABSTRACT

In one embodiment, a method includes accessing a model of a set of nodes including a session node and multiple linked nodes linked to the session node. The linked nodes include parent nodes and child nodes. A parent node links one or more child nodes to the session node, and a child node has one or more parent nodes linking the child node to the session node. The method includes generating a probability distribution for the set of nodes that distributes probabilities to all linked nodes within a predetermined number of links from the session node. Each child node receives from each of its parent nodes a predetermined fraction of a probability distributed to the parent node, and the parent node uniformly distributes to each of its child nodes the predetermined fraction of the probability distributed to the parent node.

24 Claims, 3 Drawing Sheets

RANKING NODES FOR SESSION-BASED QUERIES

RELATED APPLICATION

This Application claims the benefit, under 35 U.S.C. §119(e), of Provisional U.S. Patent Application No. 60/876,546, filed 22 Dec. 2006.

TECHNICAL FIELD

This disclosure relates generally to searching interlinked objects, such as web pages in the World Wide Web.

BACKGROUND

Node ranking for web-based searches is important technology. For example, PAGERANK, used by GOOGLE, examines the structure of the World Wide Web to rank web pages. However, while PAGERANK has been successful, it does not accurately model typical search behavior of a user.

DESCRIPTION OF EXAMPLE EMBODIMENTS

Particular embodiments provide a session-based user model for searching a collection of interlinked documents or other objects, such as, for example, web pages in the World Wide Web. Particular embodiments compute a total order (or rank) for a set of objects that more closely tracks typical user behavior than previous techniques.

PAGERANK is an algorithm that ranks web pages by examining links among them. The ranks obtained for each web page $P_i$ correspond to a probability that a user would eventually visit $P_i$ if the user randomly selected links starting from a web page selected at random. This model of "surfing" the World Wide Web is a Random Surfer Model.

Assume the web comprises n pages $P_1, \ldots, P_n$ and that each page i includes $l_i$ outgoing links. $E_{ij}=1$ denotes the presence of a link from page i to page j. Otherwise, $E_{ij}=0$. PAGERANK computes a vector R of ranks for each of the n pages, where R(i) corresponds to a rank of page i. PAGERANK does this iteratively until computed vectors between two iterations are similar. The algorithm performs the following computations:

$$R_0(j) = \frac{1}{n}$$

$$R_{t+1}(j) = \alpha \sum_i E_{ij} \frac{R_t(i)}{l_i} + (1-\alpha) \frac{1}{n}$$

In PAGERANK, the value of $\alpha$ is 0.85.

Initially, the probability of a user visiting a particular web page is the same for all web pages. The probability that the user will visit web page i at iteration t is $R_t(i)$. Since the user will select one of the $l_i$ links in web page i at random, the probability that the user will then jump to web page j is $$E_{ij} \frac{R_t(i)}{l_i}.$$

PAGERANK adds this probability to the probability $R_{t+1}(j)$ that the user will be at web page j at the next step. The probability that the user will jump to a web page other than web page j is $1-\alpha$, which is relatively small.

While a Random Surfer Model is relatively easy to analyze, it does not accurately capture the way a real-life user runs searches. In contrast, particular embodiments utilize a model based on the notion of search sessions.

Figure 1:
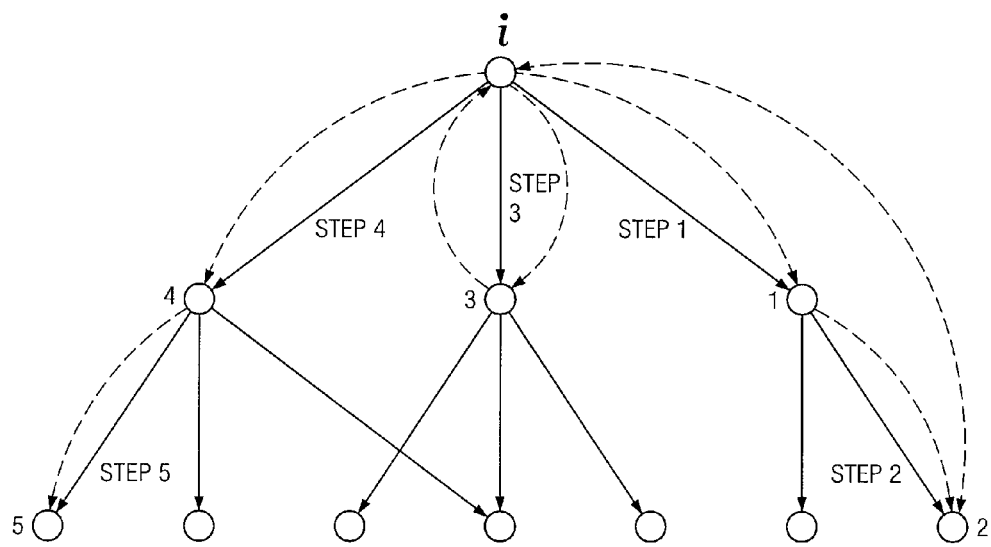
FIG. 1 illustrates example search behavior of a user across a set of web pages.

FIG. 1 illustrates example search behavior of a user across a set of web pages. Assume a user starts a search from a session page i. The user then follows one of the $l_i$ outgoing links to another page j and continues to traverse a sequence of links until the user either stops searching or goes back to session page i and follows a different path of links. For example, the user may start a search from session page i. The user may visit node 1 and continue to node 2. Herein, where appropriate, reference to a node may encompass a web page or other linkable object, and vice versa. If the user does not find what the user wants, the user may return to session page i and select another link, ending at node 3. The user may decide this is an undesirable direction and again return to session page i. The user may then follow a link that ends at node 4, eventually leading to node 5.

This way of searching more closely matches typical behavior of a real-life user. The user does not follow a long path of links to find a page, but rather follows a smaller sequence of links at the end of which the user decides whether to continue the sequence. If the user were to discontinue the sequence, the user backtracks to the original page to start down another path. Such search patterns provide a basis for an Intelligent Surfer Model. Particular embodiments may use such search patterns to compute ranks among web pages or other linkable objects.

Let $H_i^d$ be a set of pages that are d links away from session page i. Let $H_i$ be a set of pages that are at most k links away from session page i. Particular embodiments iteratively compute probability vector R starting from the following uniform distribution:

$$R_0(j) = \frac{1}{n}$$

$$R_{t+1}(j) = \alpha \sum_i C_{ij} R_t(i) + (1-\alpha) \frac{1}{n}$$

$R_0$ implies that initially all nodes are equally probable as session nodes. $C_{ij}$ denotes a fraction of probability $R_t(i)$ that session page i contributes to node j at iteration t. $C_{ij}$ is nonzero only when there is a path of at most k links between nodes i and j. Particular embodiments may precompute $C_{ij}$, since $C_{ij}$ is independent of t.

Particular embodiments distribute the probability $R_t(i)$ to the nodes in Hi in a layered fashion. For example, a first step may distribute all $R_t(i)$ to the $l_i$ nodes in $H_i^1$. For simplicity, particular embodiments may assume this distribution to be uniform. A second step may distribute to the nodes in $H_i^2$ linked from j a percentage of the probability each node j in $H_i^1$ has received. Again, for simplicity, particular embodiments may assume that ½ the probability at j is distributed evenly to the $l_j$ nodes that j links to. Particular embodiments may repeat this process for k steps.

Figure 2:
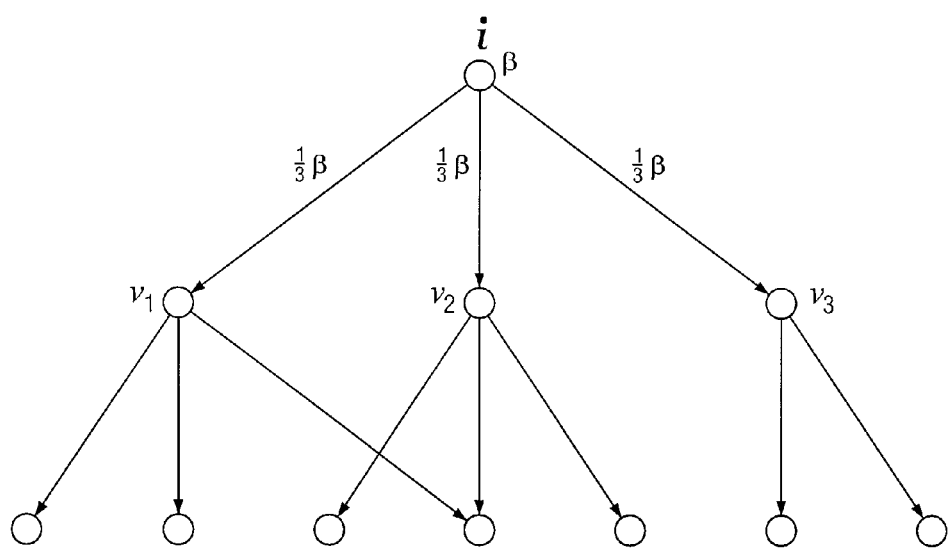
FIG. 2 illustrates an example distribution of probabilities across a first layer of a set of web page.
Figure 3:
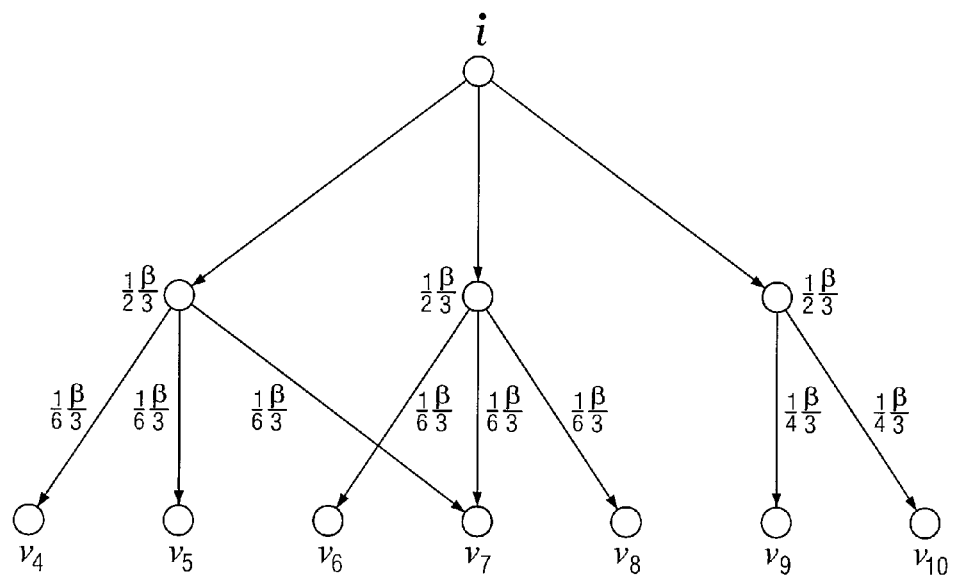
FIG. 3 illustrates an example distribution of probabilities across a second layer of the set of web pages in FIG. 2.
Figure 4:
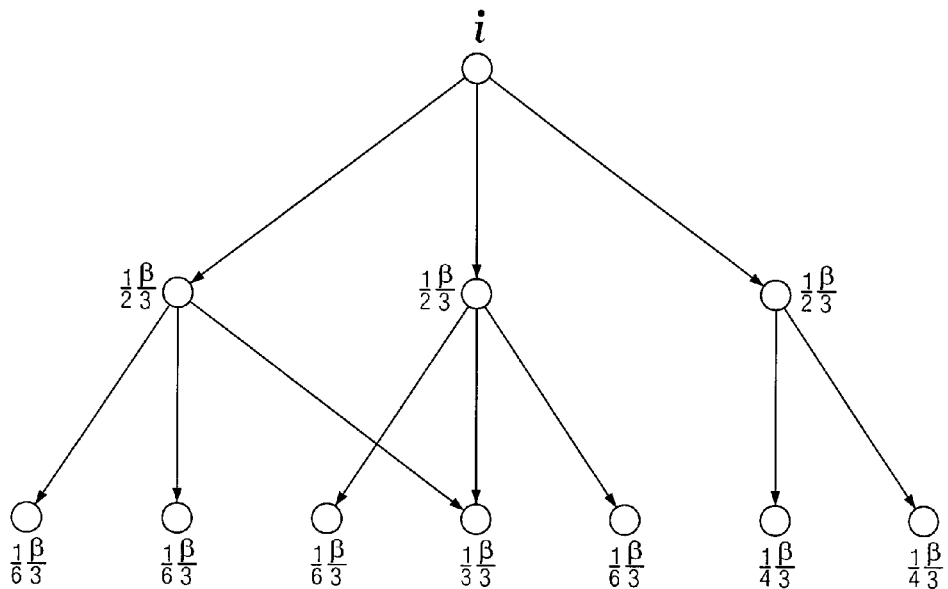
FIG. 4 illustrates an example distribution of probabilities across the first and second layers of the set of web pages illustrated in FIG. 2.

FIGS. 2-4 illustrate an example distribution demonstrating how particular embodiments may distribute $R_r(i)$ to nodes in $H_i$. As FIG. 2 illustrates by way of example, a first step evenly distributes to nodes $v_1$, $v_2$, and $v_3$ the probability $\beta=R_r(i)$, which has accumulated at node i. As FIG. 3 illustrates by way of example, a subsequent step distributes 50% of the probabilities at nodes $v_1$, $v_2$, and $v_3$ to nodes $[v_4, v_5, v_6]$, $[v_6, v_7, v_8]$, and $[v_9, v_{10}]$, respectively. FIG. 4 illustrates an example resulting distribution of $\beta$. Particular embodiments directly obtain factors $C_{ij}$ from this analysis, and in particular embodiments, factors $C_{ij}$ are independent from $\beta$. As an example and not by way of limitation, in particular embodiments, $$C_{iv_7} = \frac{1}{9}$$

and $$C_{iv_3} = \frac{1}{6}.$$

Particular embodiments may perform the operations on each iteration by looking up the corresponding $C_{ij}$ factors. In such embodiments, it may be unnecessary to perform link traversals at each iteration.

In particular embodiments, factor k is important to the performance of the algorithm. Factor k captures a number of links a user is willing to traverse to find a desired web page. Accordingly, factor k tends to model user patience. In particular embodiments, for k=1, the methodology may revert to PAGERANK calculation. Accordingly, particular embodiments may encompass PAGERANK.

Figure 5:
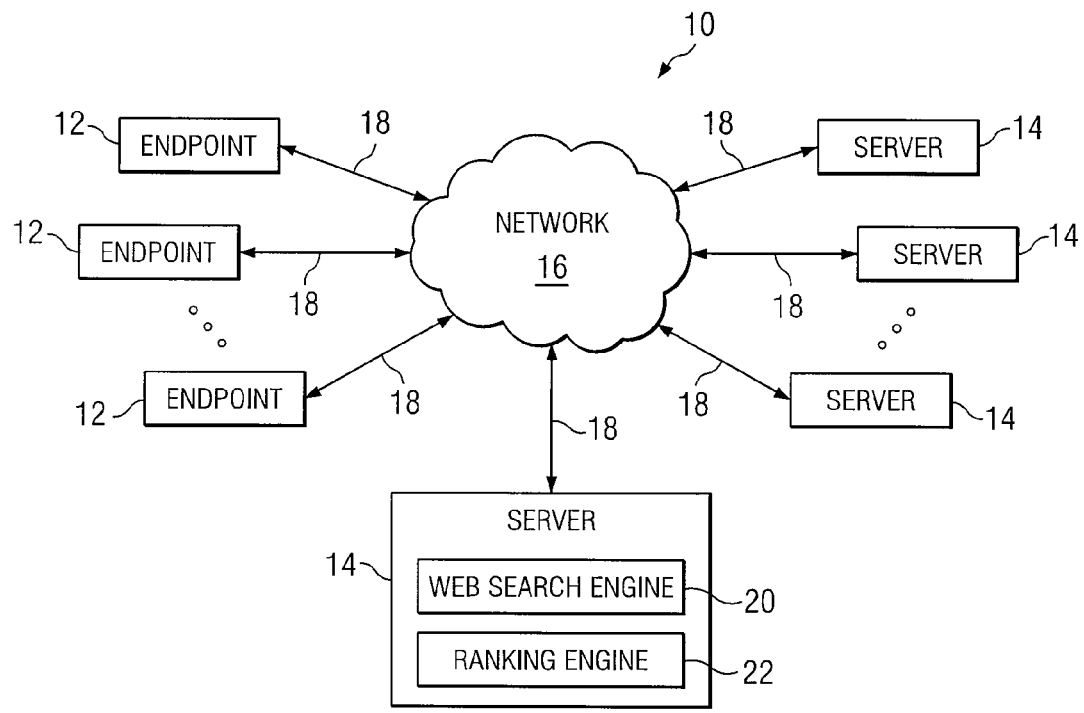
FIG. 5 illustrates an example system for ranking nodes for session-based queries.

FIG. 5 illustrates an example system 10 for ranking nodes for session-based queries. System 10 includes endpoints 12 and servers 14 that communicate via network 16. In particular embodiments, network 16 is a local area network (LAN), a wireless LAN (WLAN), a wide area network (WAN), a metropolitan area network (MAN), a portion of the Internet, or another network 16 or a combination of two or more such networks 16. The present disclosure contemplates any suitable network 16. One or more links 18 couple each of one or more endpoints 12 or one or more servers 14 to network 16. In particular embodiments, one or more links 18 each include one or more wireline, wireless, or optical links 18. In particular embodiments, one or more links 18 each include a LAN, WLAN, a WAN, a MAN, a portion of the Internet, a portion of the Public Switched Telephone Network (PSTN), an access network, or another link 18 or a combination of two or more such links 18. The present disclosure contemplates any suitable links 18 coupling any suitable endpoints 12 and any suitable servers 14 to any suitable network 16.

Endpoints 12 enable users to communicate via network 16. As an example and not by way of limitation, an endpoint 12 may include a computer system (such as a notebook or desktop computer system), a mobile telephone (which may include functionality for browsing the World Wide Web), or another endpoint 12. Servers 14 provide endpoints 12 access to functionality or data at servers 14. As an example and not by way of limitation, a server 14 may include one or more web servers. A web server may receive one or more Hyper Text Transfer Protocol (HTTP) requests from an endpoint 12 and communicate to endpoint 12 one or more HTTP responses with the requested data, such as one or more web pages. A web page may include one or more Hypertext Markup Language (HTML) documents. As another example, a server 14 may include one or more application servers. The present disclosure contemplates any suitable servers 14.

In particular embodiments, one or more servers 14 in system 10 include one or more web search engines 20, one or more ranking engines 22, or both. In particular embodiments a bus or other wire or wires couple one or more web search engines 20 to one or more ranking engines 22 for communication between them. Examples of web search engines 20 include BAIDU, GOOGLE, LIVE SEARCH, and YAHOO! SEARCH. The present disclosure contemplates any suitable web search engine 20. Moreover, the present disclosure contemplates any suitable search engines, which may but need not necessarily be web search engines 20. In particular embodiments, a ranking engine 22 includes a hardware, software, or embedded logic component or a combination of two or more such components for ranking web pages or other linkable objects, as described above. As an example and not by way of limitation, a ranking engine 22 may rank all or a subset of all web pages at servers 14, and one or more web search engines 20 may use the rankings generated by ranking engines 22 (possibly along with one or more other rankings generated by other ranking engines 22, one or more other criteria, or both) to generate and return search results to a user at an endpoint 12 in response to a search query from the user at endpoint 12.

Particular embodiments attempt to model an intelligent surfer, assuming the following user model: A user starts searching from a session page P and follows a fixed number N of links originating from it. With some probability, the user will be unsuccessful and return to session page P to follow a different path of links. In particular embodiments, PAGERANK may be a special case of such a model, where N=1. Particular embodiments provide better rankings of web pages or other interlinked objects for generating and returning search results.

Particular embodiments provide flexibility in the distribution of probabilities to linked nodes, the ranking of the linked nodes based on the distribution of probabilities, or both. As an example and not by way of limitation, particular embodiments may take into account whether the user is expert or novice when ranking nodes. An accessible profile of the user may indicate whether the user is expert or novice. The user may instead provide input indicating whether the user is expert or novice. If the user is novice, particular embodiments may use a smaller factor k to rank nodes for the user. If the user is expert, particular embodiments may use a larger factor k to rank nodes for the user. Particular embodiments may assign multiple rankings to each of one or more the nodes. As an example and not by way of limitation, to assign such rankings, particular embodiments may use a data structure that includes multiple inverted indices, with one inverted index per rank.

In particular embodiments, distinguishing between expert and novice translates to using different depth parameters to rank the nodes and keeping the different resulting probability distributions. Each distribution may impose an ordering on the nodes, with the node having the highest probability receiving rank 1, the node having the second highest probability receiving rank 2, and so on. Particular embodiments may use this ordering to generate an inverted index, which may be a data structure that returns a list of node identifiers (IDs), sorted by rank, when provided a search term. This list of node IDs may correspond to the set of nodes (which may be web pages) that include the search term. Different depth values may correspond to different orderings and, as a result, particular embodiments may generate a different inverted index for each depth value. Particular embodiments may select the inverted index at run time, either by a direct selection from the user or by profiling a search pattern of the user.

Figure 6:
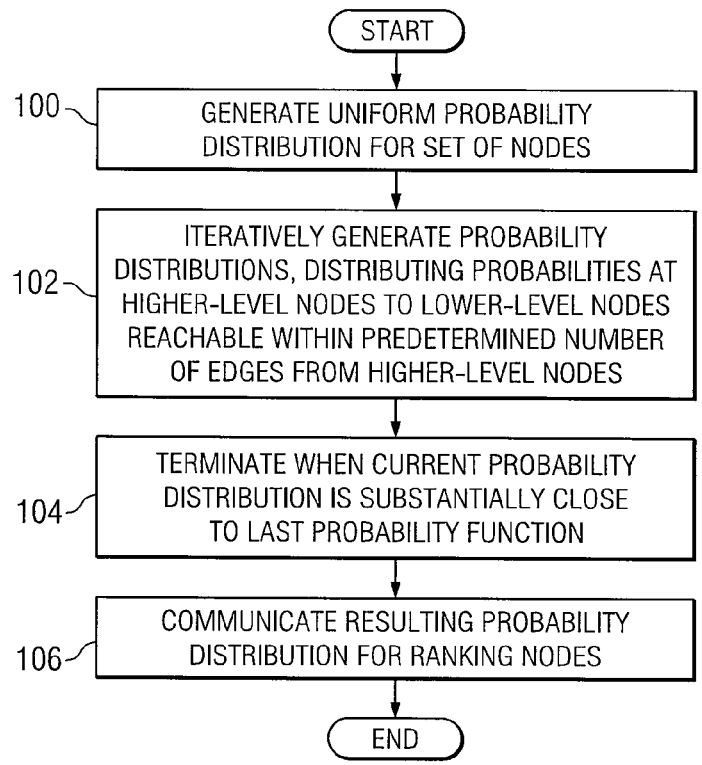
FIG. 6 illustrates an example method for ranking nodes for session-based queries.

FIG. 6 illustrates an example method for ranking nodes for session-based queries. Let G=(V, E) be a graph modeling the World Wide Web. Nodes V represent web pages, while edges E between nodes represent web links between pairs of web pages. Let N be the number of consecutive links a user is willing to follow from an initial web page until the user gives up and starts over from the initial web page. The term N attempts to track user patience. Given G and N, the algorithm attempts to find a probability distribution D across nodes V that corresponds to a user following an intelligent-surfer search pattern, i.e., a user following an intelligent-surfer search pattern will be more likely to reach a node having a higher probability in the probability distribution D. The method begins at step 100, where the algorithm generates a uniform distribution $D_0=U$ for V. At step 102, the algorithm iteratively generates "better" distributions $D_i$ until converging on a final distribution D. At every iteration i, the algorithm distributes the probability $D_i(v)$ at each node v to all nodes reachable from v within N edges. The algorithm thus obtains the distribution $D'_{i+1}$. In particular embodiments, the algorithm weights the probability distribution $D_i$ with U to generate the distribution $D_{i+1}$. At step 104, the algorithm terminates when $D_{i+1}$ and $D_i$ are substantially close to each other, possibly according to one or more predetermined criteria. At step 106, the method communicates the resulting probability distribution D for ranking the nodes, at which point the method ends. Particular embodiments run the algorithm multiple times for multiple values of N, according to particular needs. Some such embodiments average the resulting distributions together or present the user a choice when the user runs a search.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising, by one or more computing devices:
    accessing a model of a set of nodes comprising a session node and a plurality of linked nodes linked to the session node, the linked nodes comprising parent nodes and child nodes, a parent node linking one or more child nodes to the session node, a child node having one or more parent nodes linking the child node to the session node;
    generating a probability distribution for the set of nodes that distributes probabilities to all linked nodes within a predetermined number of links from the session node, each child node receiving from each of its parent nodes a predetermined fraction of a probability distributed to the parent node, the parent node uniformly distributing to each of its child nodes the predetermined fraction of the probability distributed to the parent node; and
    communicating the probability distribution for use in ranking the set of nodes.

2. The method of claim 1, wherein the nodes are web pages comprising Hypertext Markup Language (HTML) documents.

3. The method of claim 1, wherein the predetermined number of links models user patience.

4. The method of claim 1, wherein the predetermined number of links derives from:
    input provided by a user searching the set of nodes, the input indicating whether the user is novice or expert; or
    data profiling one or more search patterns followed by the user.

5. The method of claim 1, wherein the predetermined number of links is two or more.

6. The method of claim 1, wherein the predetermined number of links is two.

7. The method of claim 1, wherein the predetermined fraction is ½.

8. The method of claim 1, wherein the model of the set of node comprises a graph modeling at least a portion of the World Wide Web.

9. The method of claim 1, wherein the rankings facilitate searching among the set of nodes to generate a response to a query from a user.

10. The method of claim 1, further comprising:
    generating a plurality of probability distributions for the set of nodes that distribute probabilities to all linked nodes within different predetermined numbers of links from the session node;
    averaging the probability distributions; and
    communicating the averaged probability distribution for use in ranking the set of nodes.

11. The method of claim 1, further comprising:
    generating a plurality of probability distributions for the set of nodes that distribute probabilities to all linked nodes within different predetermined numbers of links from the session node; and
    communicating the plurality of probability distributions for use in ranking the set of nodes according to preferences specified by a user.

12. The method of claim 1, wherein generating the probability distribution for the set of nodes comprises iteratively computing probability distributions starting from a uniform probability distribution, the generated probability distribution resulting from a convergence of the iteratively computed probability distributions.

13. One or more computer-readable non-transitory storage media embodying software that is operable when executed to:
    access a model of a set of nodes comprising a session node and a plurality of linked nodes linked to the session node, the linked nodes comprising parent nodes and child nodes, a parent node linking one or more child nodes to the session node, a child node having one or more parent nodes linking the child node to the session node;
    generate a probability distribution for the set of nodes that distributes probabilities to all linked nodes within a predetermined number of links from the session node, each child node receiving from each of its parent nodes a predetermined fraction of a probability distributed to the parent node, the parent node uniformly distributing to each of its child nodes the predetermined fraction of the probability distributed to the parent node; and
    communicate the probability distribution for use in ranking the set of nodes.

14. The media of claim 13, wherein the nodes are web pages comprising Hypertext Markup Language (HTML) documents.

15. The media of claim 13, wherein the predetermined number of links models user patience.

16. The media of claim 13, wherein the predetermined number of links derives from:
   input provided by a user searching the set of nodes, the input indicating whether the user is novice or expert; or
   data profiling one or more search patterns followed by the user.

17. The media of claim 13, wherein the predetermined number of links is two or more.

18. The media of claim 13, wherein the predetermined number of links is two.

19. The media of claim 13, wherein the predetermined fraction is ½.

20. The media of claim 13, wherein the model of the set of node comprises a graph modeling at least a portion of the World Wide Web.

21. The media of claim 13, wherein the rankings facilitate searching among the set of nodes to generate a response to a query from a user.

22. The media of claim 13, further operable when executed to:
   generate a plurality of probability distributions for the set of nodes that distribute probabilities to all linked nodes within different predetermined numbers of links from the session node;
   average the probability distributions; and
   communicate the averaged probability distribution for use in ranking the set of nodes.

23. The media of claim 13, further operable when executed to:
   generate a plurality of probability distributions for the set of nodes that distribute probabilities to all linked nodes within different predetermined numbers of links from the session node; and
   communicate the plurality of probability distributions for use in ranking the set of nodes according to preferences specified by a user.

24. The media of claim 13, wherein generating the probability distribution for the set of nodes comprises iteratively computing probability distributions starting from a uniform probability distribution, the generated probability distribution resulting from a convergence of the iteratively computed probability distributions.

* * * * *